J. Garfield,
Wood Molding Machine.

No. 56,548.   Patented July 24, 1866.

Witnesses:
Arthur A. Titus.
B. F. Saft.

Inventor:
Joel Garfield.

UNITED STATES PATENT OFFICE.

JOEL GARFIELD, OF GROTON, MASSACHUSETTS.

IMPROVEMENT IN PLANING-MACHINES.

Specification forming part of Letters Patent No. 56,548, dated July 24, 1866.

*To all whom it may concern:*

Be it known that I, JOEL GARFIELD, of Groton, county of Middlesex, State of Massachusetts, have invented a new and improved machine for dressing or forming eccentric forms of timber for agricultural implements and other purposes; and I do hereby declare that the following is a full and exact description thereof, reference being had to the accompanying drawings, and to the letters of reference marked thereon.

The nature of my invention consists in constructing a machine with two cutter-heads on separate upright shafts, so arranged that the space between the guide and feed rolls may be increased or diminished, so as to allow various-sized forms to pass between them; also, in constructing guide and feed rolls turning upon the same centers as the cutter-heads. By this device the timber from which the form is to be made is operated upon by the cutter-heads on both sides at the same time. The guides act also as feed-rolls, and the form is worked out entire at one operation with great rapidity and with ease and safety to the operator.

To enable others skilled in the art to make and use my invention, I will proceed to describe its construction and operation.

Figure 3:
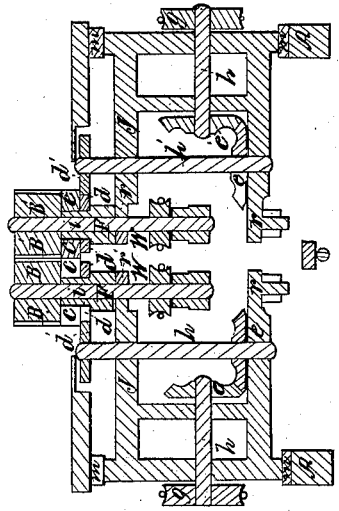
Figure 4:
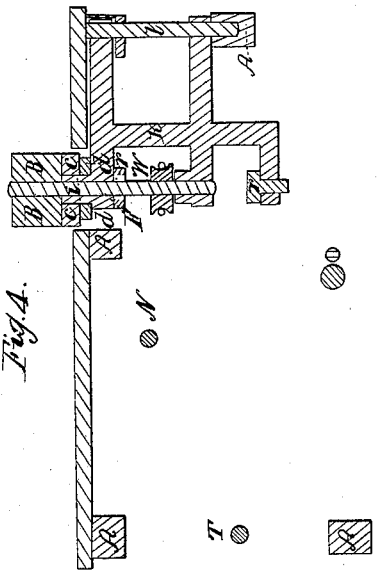
Figure 1:
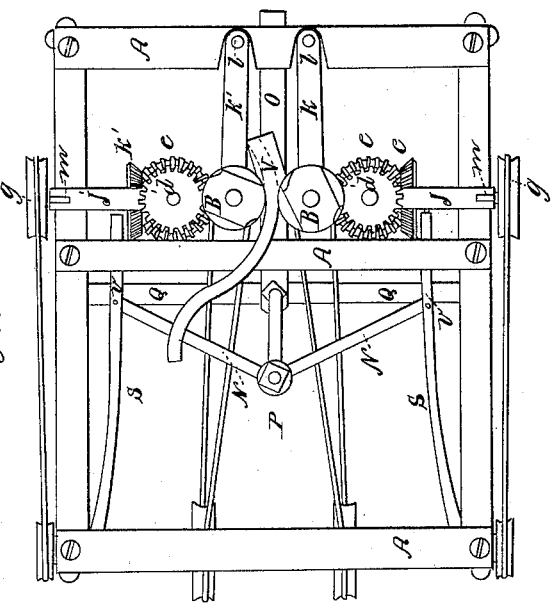
Figure 2:
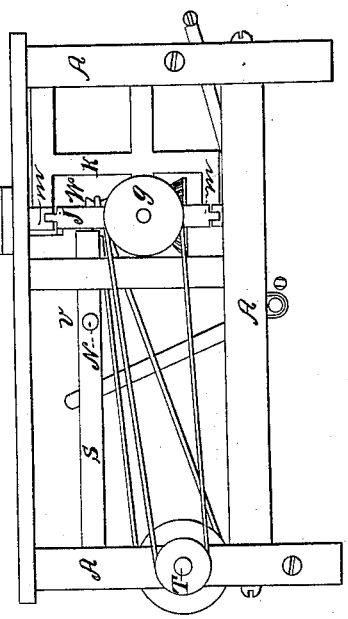

Figure 1 is a bird's-eye view with the top platform removed. Fig. 2 is a side elevation. Fig. 3 is a vertical transverse section through the center of the cutter-heads, feed-rolls, &c. Fig. 4 is a vertical longitudinal section through the center of cutter-head, feed-roll, &c.

Like letters represent like parts in all the figures.

A A A is the frame. B and B' are the cutter-heads. c c are the feed-rolls and guides, and are placed directly under the cutter-heads B and B', and turn on the same center, and the boxes i i that support the journals of the cutter-heads B and B' are constructed to form the journals upon which the feed and guide rolls c c turn. (Shown in Figs. 3 and 4.) d d are feed-gears, which are connected with the bevel-gears e e' by means of shafts h' h', which are connected with the feed-pulleys g g by the shafts h h. (Shown in Fig. 3.)

The feed-rolls c c and cutter-heads B B' and their journals are supported by the metal frames J J' and K K', and they are attached to the frame A A by the shafts l l' and slides m m m m. (Shown in Figs. 1 and 3.)

The levers N N are attached to the operating-lever O at the rear end by the flexible joint P. The lever O is fixed to the rocking-shaft Q, which is supported by the frame A. The forward end of the levers N N are attached to the springs S S, which are fixed to the wood frame A and the sliding frames J J', which are connected to the frames K K' by means of the flexible joints r r'. (Shown in Figs. 1, 3, and 4.)

T is the driving-shaft, Fig. 2. v v are flexible joints that connect the levers N N with the springs S S. Q is a rocking-shaft, to which the operating-lever O is attached.

Operation: By belting the several pulleys with the driving-shaft T, which may be set in motion by attaching a running belt at any convenient place on the shaft T, the cutter-heads B B' are revolved by the pulleys W W. The feed and guide rolls c c are revolved by the pulleys g g and the bevel-gears e e' and the spur-gears d d and their connecting-shafts h h h' h'. The feed and guide rolls are held together on their peripheries by means of the springs S S. The space between the guide and feed rolls may be increased or diminished to receive the pattern and the timber to be operated on by pressing down the operating-lever O, which presses upon the levers N N, which are pivoted to the springs S S, and the springs being attached to the sliding frames J J', which being connected with the swinging frames K K' by the flexible joints r r', the cutter-heads and the guide and feed rolls are pressed outward and the space between the guide and feed rolls and cutter-heads is increased. The sliding frames J J' move in the slides m m m m, and the swinging frames K K' turn on the shafts l l' and the flexible joints r r r' r'. Thus the space between the feed and guide rolls will be increased to receive the pattern V between the guide-rolls, and the timber V to be operated on is attached to the form or pattern so that it will not slip. The timber comes in contact with the cutter-heads, and the form or pattern V comes in contact with the guide and feed rolls, which turn on the same centers as the cutter-heads. Consequently the cutter-heads work the timber into the same shape or form as the pattern to which it is attached.

The space between the guide and feed rolls is increased by means of the flexible joints and slides, and the cutter-head shafts F will always be parallel with each other, and patterns of various widths or forms will pass readily between the guide and feed rolls. The springs S S will hold the guide and feed rolls firmly against the pattern. The cutter-heads operate at the same time on both sides of the timber to be formed. Therefore the guide and feed rolls will hold the pattern more firmly than it can be held by hand, and will work more rapidly and with greater ease and safety to the operator.

What I claim as new, and desire to secure by Letters Patent, is—

1. The combination of the feed and guide rolls $c\ c$ with the gears $d$ and $d'$, constructed and operating substantially as specified, for the purposes set forth.

2. The combination of the frame J K with the slides $m\ m$, the shafts $l$ and F, constructed substantially as described, for the purposes set forth.

3. The combination of levers O and N N with springs S S and the shaft Q, operating substantially as described, for the purpose set forth.

JOEL GARFIELD.

Witnesses:
ARTHUR F. TITUS,
B. F. TAFT.